United States Patent [19]

Biglione et al.

[11] Patent Number: 4,606,873

[45] Date of Patent: Aug. 19, 1986

[54] PROCESS FOR THE PRODUCTION OF EXPANDABLE GRANULES OF THERMOPLASTIC POLYMERS AND RELATIVE APPARATUS

[75] Inventors: Gianfranco Biglione; Giuseppe Cigna; Roberto Rinaldi, all of Mantova, Italy

[73] Assignee: Montedison S.p.A., Milan, Italy

[21] Appl. No.: 610,823

[22] Filed: May 16, 1984

[30] Foreign Application Priority Data

May 19, 1983 [IT] Italy .............................. 21180 A/83

[51] Int. Cl.$^4$ ........................... B29B 9/06; C08J 9/16; C08J 9/12
[52] U.S. Cl. ..................................... 264/53; 264/142; 264/570; 425/202; 425/311; 425/817 R
[58] Field of Search .................. 264/142, 53, 570, 51; 425/817 R, 202, 311

[56] References Cited

U.S. PATENT DOCUMENTS 3,892,834 7/1975 Pritchard ............................ 264/142
4,385,016 5/1983 Gwinn ............................ 264/142 X Primary Examiner—Philip Anderson

[57] ABSTRACT

A process for the production of expandable granules of thermoplastic polymers comprising: (a) the extrusion of the polymer in which an expanding agent is incorporated, through a die-head in order to obtain an expandable polymer; (b) immediate cooling of this polymer in water, kept at a temperature at which the polymer remains in the non-expanded state, but not lower than the Tg of the expandable polymer; (c) cutting of the polymer to granules in water immediately at the outlet of the die-head, and (d) annealing of the thus obtained granules, by slow cooling in a temperature range comprised between at least +5° C. and at least −5° C. the Tg of the expandable polymer, wherein the cooling and the cutting of the polymer to granules and the annealing thereof are carried out under pressure.

The apparatus comprises an extruder; a means for injecting the expanding agent into the extruder; a die-head; a chamber fastened to said die-head and provided with cutter and pipes for feeding water under pressure; a tower for the annealing of the granules and a means for maintaining the pressure in the chamber and in the tower.

13 Claims, 1 Drawing Figure

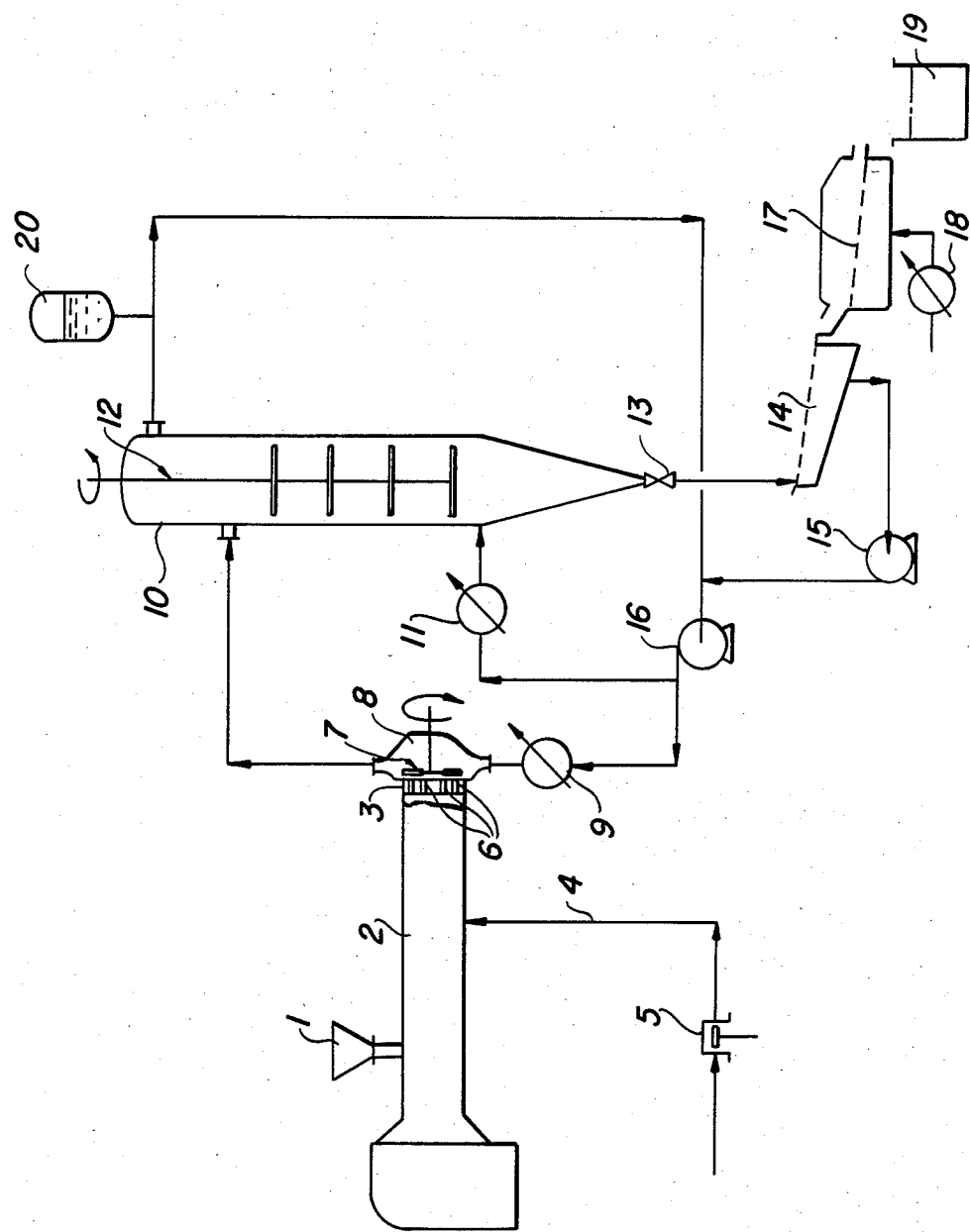

PROCESS FOR THE PRODUCTION OF EXPANDABLE GRANULES OF THERMOPLASTIC POLYMERS AND RELATIVE APPARATUS

BACKGROUND OF THE INVENTION

1. Field of the Invention

The present invention relates to a process for the production of expandable granules of thermoplastic polymers and to the relative apparatus.

More particularly, the present invention relates to a process for the production of extrusion of non-oriented and non-stressed expandable polymers, particularly suitable for the production of expanded articles.

2. Description of the Prior Art

It is known that the thermoplastic polymers, such as for instance polystyrene, may be expanded by incorporating intimately into the polymer an expanding agent and then by heating the polymer under such conditions that its viscosity lowers and the expanding agent is allowed to vaporize and to form quite a number of closed spaces or cells in the polymer.

When polystyrene is concerned, as a rule, an organic liquid vaporizable substance, such as for instance a hydrocarbon containing from 4 to 6 carbon atoms is used as expanding agent.

The amount of expanding agent contained in the polymer may range between 2 and 10% by weight.

The expandable polymers are generally provided in the form of beads or granules, which by effect of the heat and in particular of the water vapor, are firstly expanded till the desired density is reached and, after maturation in the air, are molded in shape to obtain expanded blocks and shaped articles.

The obtained expanded articles have a closed cell structure and are suitable to be used in important fields, such as in the building, refrigeration, packaging fields, etc.

These expandable beads are obtained by means of a polymerization process in suspension, appropriately combined with an impregnation procedure of the polymer with the expanding agent.

This process, that is of discontinuous kind, provides a product of good quality, but of a rather dispersed granulometry. That involves a subsequent screening to remove out of size particles.

The polymerization process in suspension involves moreover substantial restrictions concerning the production of particular products, such as for instance the production of colored expandable beads, because some kinds of dyes or pigments either can be incorporated into the polymer with difficulty or alternatively they can inhibit the polymerization. The same drawback can happen when nucleating agents are concerned, which are generally added to improve the cellular structure of the expanded polymer.

Another process, that is industrially less used, for the production of expandable polystyrene, consists in adding the expanding agent into the molten polymer during the extrusion, in drawing the resulting mass to spaghetti, in cooling and in cutting them at a distance to expandable granules.

This type of process foresees the feed of polystyrene granules into an extruder with continuous injection, by means of a metering pump, of an expanding agent into the extrusion melt.

The resulting expandable mass is drawn to spaghetti, which are cooled in cold water in order to bring them rapidly from the extrusion temperature to a temperature lower than the Tg of the expandable polymer.

This rapid cooling allows to avoid the polymer expansion, but it presents the great drawback to induce into the granules orientations and stresses caused by quenching, which, as known, affects negatively the uniformity of the cellular structure and the performances of the expanded product.

In order to improve the quality of the expandable granules obtained by extrusion, it was proposed to eliminate the orientations and the stresses frozen in them, by means of a subsequent annealing at a temperature lower than the Tg of the polymer at room pressure.

Obviously this operation needs an additional stage, that requires relatively long times. Furthermore since it has to be carried out at a temperature lower than the Tg of the expandable polymer to avoid the granule expansion, this annealing operation does not allow to eliminate completely the above mentioned drawbacks.

In order to eliminate them, on the contrary, it should be necessary to work at a temperature higher than the Tg of the polymer and to cool slowly. This process, however, involves the risk of the non-desired expansion of the material.

THE PRESENT INVENTION

An object of the present invention is to provide a process for the production of extrusion of spherical granules of thermoplastic polymers substantially similar to the ones obtained by the polymerization process.

More particularly, an object of the present invention is to provide a process for the production by extrusion of spherical granules of expandable thermoplastic polymers substantially free from orientations and stresses caused by quenching.

A further object of the present invention is to provide an apparatus to carry out the hereinbefore process.

According to the present invention the aforesaid objects and others are achieved by means of a process for the production by extrusion of expandable granules of thermoplastic polymers comprising, successively, the following stages:

(a) extrusion through a die-head of the polymer in which an expanding agent is incorporated;

(b) immediate cutting of the polymer at the die-head outlet and cooling of the thus obtained granules in water or of a fluid kept at a temperature higher than the Tg of the expandable polymer;

(c) slow cooling of the thus obtained granules at a temperature ranging between at least $+5°$ C. and at least $-5°$ C. the Tg of the expandable polymer;

wherein, both the cutting of the polymer to granules and the cooling of same are carried out at a pressure higher than 2 Bar.

The Tg is determined according to method DSC (differential scannin calorimetry), by using a determinate amount of material (2-3 granules) and by heating at a velocity of $10°$ C./min. The Tg value is obtained graphically by intersection of the tangent to the base line preceding the transition with the tangent through the point of inflexion relative to the transition itself.

The apparatus for carrying out the hereinabove process comprises an extruder; a means of injection of the expanding agent into the extruser; a die-head; a chamber fastened to said die-head provided with a rotable cutter and pipelines for feeding the water or the fluid under pressure to said chamber; a tower for the slow cooling (annealing) of the granules; some pipes for feeding the granules to said tower; some means for recoverng the water or the fluid and a pressurization system to keep under pressure said chamber, the cooling tower, the pipes and the recovery means of the water or of the fluid.

We would point out that the essential conditions of the process, object of the present invention, are the cutting of the expandable polymer, at the outlet of the die-head, under pressure and at a temperature higher than its Tg and the very slow cooling of the granules till a temperature lower than its Tg is reached. Preferably, the granules are brought from at least +5° C. to at least −5° C. the Tg of the polymer, by a cooling rate of <3°/minute.

These conditions are essential both to avoid a beginning expansion of the granules and to reduce to a minimum the formation in said granules of orientation, stresses and/or internal holes caused by quenching.

The expandable granules obtained according to the process object of the present invention, have a narrow granulometric distribution and are, from the point of view of their behavior in the subsequent operations of expansion and shape molding, similar to the well known expandable beads obtained by incorporating the expanding agent during the polymerization process in suspension.

The temperature, at which the polymer is extruded, depends on the softening temperature of the polymer composition containing the expanding agent. To avoid phenomena of solidification or obstruction of the polymers in the extrusion holes, the extrusion temperature is always kept at a value much higher than the softening one.

The required extrusion temperature, as known, depends, moreover, on the sizes of the die-head holes and in the present process, also on the temperature of the water, into which the extruded polymer is cooled. So, for instance, when polystyrene containing from 1 to 4% by weight of pentane, as expanding agent, is used, the extrusion temperature ranges between 100° and 130° C., if the extrusion holes have a diameter of 2-4 mm. Higher temperatures are required, when the holes are smaller. Generally, temperatures up to 200° C. may be used for extrusion holes having a diameter smaller than 1 mm.

The temperature of the water or of the fluid, into which the granules are dipped after the cutting, depends on the content of expanding agent in the polymer. Generally this temperature ranges between room temperature and 80° C. Besides water, other fluids such as glycerol or ethylene glycol or a mixture of water and ethylene glycol may be used.

The extrusion die-head may contain several holes having a diameter that may vary between 0.5 and 4 mm.

The cooling of the granules is carried out very slowly, preferably 1-2°/minute, in a suitable annealing tower preferably provided with stirrer and internal baffles, in order to regulate and slow down the granule drop.

In this annealing tower, the particle temperature is brought from 40°-80° C. to 20°-40° C.

Among the thermoplastic polymers, particularly suitable for the process of the present invention, the polystyrene is in the first place; other thermoplastic compounds, however, such as polyolefins, poly-vinylaromatic, poly-vinyliden-aromatic compounds or copolymers thereof may be used. Mixtures of thermoplastic polymers can be used as well.

The vaporizable expanding agent can be a liquid organic substance, having no solvent action towards the polymer. Preferably, the expanding agent is an organic liquid boiling, at standard pressure, between 10° and 90° C. and preferably between 20° and 80° C. Generally aliphatic saturated hydrocarbons such as n.pentane, isopentane or mixture thereof are preferred. Butane, hexane, petroleum ether, cyclopentane or fluorochloro-hydrocarbons may be used as well.

If desired, the polymer can contain one or more additives, nucleant agents, modifying agents, dyes, stabilizing agents etc. according to the usual techniques.

The expandable polymer, as soon as extruded, at the die-head outlet, is cut by using the known technique of the cutting on the die-head face and the obtained granules fall into the water or into the hot fluid sorrounding said face.

The granules are conveyed by the fluid flow into an annealing tower, wherein, from the bottom, the same fluid is fed at a temperature which is regulated in such a way that a slow cooling of the granules is obtained till a temperature is reached, that is at least 5° C. lower than the Tg of the expandable polymer. At the outlet of the annealing tower, the granules are separated from the fluid by means of a screen, and dried, preferably with hot air and collected in a container.

The whole system, comprising the chamber that wraps the die-head face, the cooling tower and the fluid relevant pipes are kept under pressure, for instance, by means of a standard pressurization pot. Generally pressures higher than 2 Bar and preferably comprised between 5 and 15 Bar are used.

BRIEF DESCRIPTION OF THE DRAWING

The present invention will be better understood, if reference is made to the FIGURE of the enclosed drawing, which represents a schematic illustration of the apparatus suitable to carry out the present invention.

DESCRIPTION OF THE PREFERRED EMBODIMENT

With reference to the FIGURE, the polystyrene granules are fed, through hopper (1), to a screw extruder (2) of known type for plasticizing the polystyrene and letting the plasticized polymer, under pressure, move, towards extruder head (3). The expanding agent, in particular pentane, is fed to extruder (2) through injection line (4) and by means of pump (5).

The last section of extruder (2) is shaped in such way as to provide the required mixing in order to insure an intimate and a perfect distribution of pentane into polystyrene.

The polymer containing pentane is extruded through holes (6) of the die-head (3) and immediately cut by means of a cutting knife (7) rotating tangentially to the free surface of the die-head.

The polymer cut to granules enters cutting chamber (8) that surrounds the die-head and where water or another fluid is contained at a pressure higher than 2 Bar and at a temperature higher than the Tg of the expandable polymer and preferably comprised between 40° and 80° C. A heat exchanger (9) provides to maintain the water entering chamber (8) at the required temperature. The granules are conveyed by the water flow to the upper part of an annealing tower (10), into which, from the lower part, water or another fluid is fed, kept by exchanger (11) at a temperature that is such as to carry out a cooling of the granules from at least +5° C. to at least −5° C. the Tg of the expandable polymer. The drop of the granules into annealing tower (10) is regulated by means of a stirrer (12). The polymer granules and the water are discharged from the bottom of tower (10) through a time valve (13). The sizes of tower (10), time valve (13), velocity of stirrer (12) and the amount of the granules fed into the tower, are regulated in such a way that the granules remain in annealing tower (10) for the period of time necessary for cooling the granules at a velocity of 1–2°/minute under pressure, kept by the pressurization pot (20). The granules discharged through valve (13) fall onto a screen (14), where the separation water/granules is carried out, then the granules are dried in (17) by means of air coming from exchanger (18) and collected in container (19). The recovery water is recycled by means of pumps (15) and (16).

In order to better understand the present invention and to carry out same, some examples are given hereinafter, having illustrative, exemplificative, but, however, non-limiting character of the present invention.

EXAMPLE 1

A polystyrene having a melt index of 10 g/10' was fed to extruder (2) through hopper (1). Through pump (5) and line (4) a mixture containing n.pentane/iso-pentane, 70/30 by weight, in an amount of about 6.2% by weight was added to the melted polymer. The resulting expandable mass, having a temperature of about 160° C., was drawn through an extrusion die-head (3), provided with 20 holes, each of them having a diameter of 0.7 mm. The polymer coming out of the die-head was cut by means of knife (7), rotating in contact with the surface of diehead (3), in order to obtain spheroidal granules having a diameter of about 1.2 mm.

Die-head (3) protuded into chamber (8), where the water circulated at the pressure of 9 Bar and at a temperature of 62° C.

The cut granules were conveyed by the water flow into the upper part of annealing tower (10). In tower (10), the granules were cooled slowly to about 42° C., by injecting, from the bottom of said tower, water heated by exchanger (11) at about 40° C. The drop of the granules and time valve (13) were regulated in such a way that the residence time of the granules in tower (10) was of about 15 mintues. The granules were separated in screen (14), dried by means of air at 25° C. in (17) and collected in container (19).

The expandable granules containing 6% by weight of expanding agent, were pre-expanded in a continuous pre-expander with a vapor pressure of 0.2 Ate so as a density of 18 g/l was obtained. The pre-expanded particles had a uniform cellular structure, with closed cells having an average diameter of about 50 mμ.

EXAMPLE 2 (COMPARISON EXAMPLE)

One worked according to example 1, by feeding water to chamber (8) at a pressure of 2 Bar.

The obtained granules, before pre-expansion, were partially expanded. After pre-expansion, the particles presented a very ununiform and irregular cellular structure.

EXAMPLE 3 (COMPARISON EXAMPLE)

One worked according to example 1, by feeding water to chamber (8) at 20° C. and at a pressure of 2 Bar and by collecting directly the granules coming out of chamber (8).

Granules were obtained, practically free from expansion. Said granules after pre-expansion with vapor at 0.2 Ate, presented a density of 18 g/l and an ununiform cellular structure with a circular external rim consisting of cells having an average diameter of about 40 mμ and an internal part consisting of bigger ununiform cells, variable from 40 to 150 mμ.

We claim:

1. A process for the production by extrusion of expandable granules of thermoplastic polymers comprising, successively the following stages:
   (a) extrusion through a die-head of the polymer in which an expanding agent is incorporated;
   (b) immediate cutting of the polymer at the die-head outlet and cooling of the thus obtained granules in a bath of water or of a fluid kept at a temperature higher than the Tg of the expandable polymer;
   (c) slow cooling of the thus obtained granules at a temperature ranging between at least +5° C. and at least −5° C. of the Tg of the expandable polymer; wherein both the cutting of the polymer to granules and the cooling of same are carried out under submersion in the cooling water or other fluid and at a pressure higher than 2 Bar.

2. A process according to claim 1, wherein the temperature of the bath of water or of a fluid depends on the content of the expanding agent in the polymer and is generally comprised between the room temperature and 80° C.

3. A process according to claim 1, wherein the cooling of the granules is carried out at a velocity lower than 3°/minute.

4. A process according to claim 3 wherein, during the cooling, the temperature of the granules is brought from 40°–80° C. to 20°–40° C.

5. A process according to claim 1, wherein the cutting of the polymer is carried out on the die-head face.

6. A process according to claim 1, wherein the cutting of the polymer at the die-head outlet and the cooling of the granules are carried out at a pressure comprised between 5 and 15 Bar.

7. A process according to claim 1, wherein the thermoplastic polymer is polystyrene.

8. A process according to claim 1, wherein the cooling of the granules is carried out at a velocity lower than 1–2°/minute.

9. Apparatus for the production by extrusion of expandable granules of thermoplastic polymers, comprising:
   (a) an extruder;
   (b) a means of injection of the expanding agent into the extruder;
   (c) a die-head;
   (d) a chamber fastened to said die-head and surrounding the free surface of same, provided with a cutter and pipes for feeding the water or the fluid under pressure to said chamber;
   (e) an annealing tower for the slow cooling (annealing) of the granules;
   (f) pipes for feeding the granules to said tower;
   (g) means for the recovery of the water or of the fluid; and (h) a pressurization system to keep, under pressure said chamber, the cooling tower, the pipes for feeding the granules and the recovery means of the water or of the fluid.

10. Apparatus according to claim 9, wherein the pressurization system is a pot.

11. Apparatus according to claim 9, wherein the annealing tower is provided with a stirrer and/or internal baffles, in order to regulate and slow down the granule drop.

12. Apparatus according to claim 11, wherein the annealing tower is provided, on the bottom, with a time valve.

13. Apparatus according to claim 9, wherein the lower part of the annealing tower is provided with means for feeding water or another fluid heated at a temperature such as to carry out a cooling of the granules from at least $+5°$ C. to at least $-5°$ C. the Tg of the expandable polymer, at a velocity lower than $3°$ C./minute.

* * * * *